United States Patent
Moon et al.

[11] Patent Number: 6,137,948
[45] Date of Patent: Oct. 24, 2000

[54] FRAME CONSTRUCTION APPARATUS FOR SLOW-SPEED REPRODUCTION OF A MOVING PICTURE SIGNAL

[75] Inventors: Seong-Jin Moon, Seoul; Jung-Suk Kang, Suwon, both of Rep. of Korea

[73] Assignee: Samsung Electronics Co., Ltd., Suwon, Rep. of Korea

[21] Appl. No.: 09/184,578

[22] Filed: Nov. 3, 1998

[30] Foreign Application Priority Data

Nov. 4, 1997 [KR] Rep. of Korea ..................... 97-57923

[51] Int. Cl.$^7$ ..................................... H04N 5/91
[52] U.S. Cl. ............................... 386/68; 386/125
[58] Field of Search ................... 386/46, 68, 69, 386/80, 81, 131, 125, 7; 348/443, 578

[56] References Cited

U.S. PATENT DOCUMENTS

| | | | |
|---|---|---|---|
| 4,987,489 | 1/1991 | Hurley et al. | 348/578 |
| 5,126,852 | 6/1992 | Nishino et al. | 386/109 |
| 5,850,263 | 12/1998 | Tauchi | 386/131 |
| 5,930,447 | 7/1999 | Shintani | 386/68 |

FOREIGN PATENT DOCUMENTS

| | | |
|---|---|---|
| 41-17379 | 10/1966 | Japan . |
| 4-82391 | 3/1992 | Japan . |
| 7-203375 | 8/1995 | Japan . |
| 9-261591 | 10/1997 | Japan . |
| 2 264 020 | 8/1993 | United Kingdom . |

*Primary Examiner*—Huy Nguyen
*Attorney, Agent, or Firm*—Staas & Halsey LLP

[57] ABSTRACT

An apparatus for constructing frames for low-speed reproduction of a moving picture recorded in an interlaced scanning mode. A user interface receives a user setting speed for the low-speed reproduction. A field selector generates a field select mode signal for constructing second moving picture frames (for slow-speed playback) from first moving picture frames (for normal-speed playback) in response to the input user setting speed. A frame construction unit, in response to the field select mode signal, repeatedly selects moving picture data of a first field and a second field contained in each of the first moving picture frames, to construct the second moving picture frames corresponding to the first moving picture frames, wherein the number of times each frame is selected is determined by the user setting speed. The apparatus can construct frames for low-speed reproduction from frames for normal-speed reproduction while reproducing a natural image without vibration or mixing-up the time order of the moving picture.

16 Claims, 5 Drawing Sheets

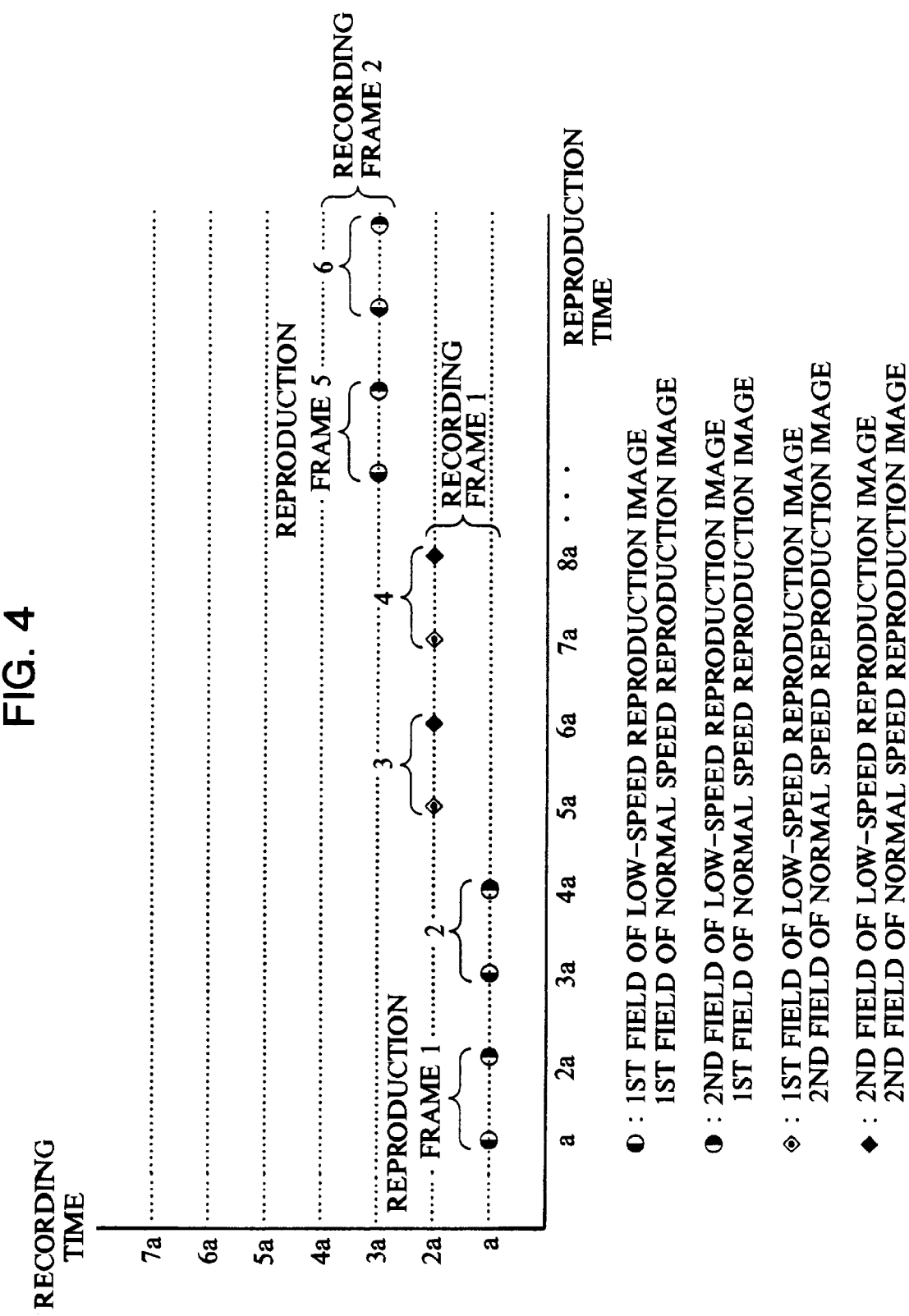

FRAME CONSTRUCTION APPARATUS FOR SLOW-SPEED REPRODUCTION OF A MOVING PICTURE SIGNAL

CROSS REFERENCE TO RELATED APPLICATION

This application claims the benefit of Korean Patent Application No. 97-57923, filed Nov. 4, 1997, in the Korean Patent Office, the disclosure of which is incorporated herein by reference.

BACKGROUND OF THE INVENTION

The present invention relates to an apparatus for slow-speed reproduction of a moving picture signal, and more particularly, to an apparatus for constructing/reconstructing frames of a moving picture signal, recorded in an interlaced scanning mode, for slow-speed reproduction.

In apparatuses, such as TV sets, which display moving pictures, a frame is an elementary unit of the moving picture signal. In an interlaced scanning mode, each frame is composed of two fields. In case of a picture for NTSC, a time interval between two frames is one thirtieth of a second and a time interval between two fields is one sixtieth of a second. Therefore, field pictures having a constant interval of time are contained in each frame. In such a frame structure, frames in normal-speed reproduction are generated continuously by combining fields.

However, when reproducing at a low-speed, both fields of a single picture frame (for normal-speed reproduction) are repeatedly used for constructing sequential repetitive frames of a moving picture signal. Alternatively, either one of the two different fields is repeatedly used for constructing sequential repetitive frames of the moving picture signal. Problems with both types of frame construction will be described with reference to the graphs FIGS. 1 and 2.

In FIGS. 1 and 2, the horizontal axis represents a reproduction time and the vertical axis represents a recording time. Both FIGS. 1 and 2 describe a low-speed reproduction at a quarter speed.

FIG. 1 is a graph showing a slow-speed reproduction using a frame repetition method. The low-speed reproduction by the frame repetition method is performed in such a manner that a first field ○ and a second field ◇ of a first moving picture frame for normal-speed reproduction are repeatedly reproduced. Specifically, the same frame is repeatedly output in sequence four times, thereby realizing slow-speed reproduction at a quarter times speed.

FIG. 2 is a graph showing a slow-speed reproduction using a conventional field repetition method. First, either one of a first field or a second field of a first moving picture frame is selected. For example, when the first field of the first moving picture frame is selected, a first field ◐ and a second field ◑ of a second moving picture frame for low-speed reproduction are constructed with only the first field of the first moving picture frame. That is, a frame produced by one field, not a frame composed of two fields for normal-speed reproduction, is repeatedly output.

In the frame repetition method, two fields having a time difference are repeatedly used for reconstructing frames in the low-speed reproduction, and thus severe fluctuation is generated in an image exhibiting a large movement. In the field repetition method, loss of information in a remaining field, not used in frame construction, is experienced, and the time difference between reproduction frames becomes a time difference between two fields, resulting in unnatural movement.

SUMMARY OF THE INVENTION

It is an object of the present invention to provide an apparatus for slow-speed reproduction of a moving picture signal, having an interlaced scanning mode, which prevents fluctuation of a picture due to a time difference between frames or unnatural movement due to loss of information contained in a field, thereby constructing a natural moving picture frame.

To accomplish an object of the present invention, there is provided an apparatus for transforming first moving picture frames, having an interlaced scanning mode in normal-speed reproduction, into second moving picture frames for slow-speed reproduction, having a speed lower than that of the normal-speed reproduction, the apparatus generally comprising a user interface receiving a user setting speed for the low-speed reproduction, a field selector generating a field select mode signal for constructing the second moving picture frames from the first moving picture frames, in response to the user setting speed, and a frame construction unit that, in response to the field select mode signal, repeatedly selects, by a first and second numbers of times, moving picture data of a first field and of a second field contained in each of the input first moving picture frame data, to construct the second moving picture frames corresponding to the first moving picture frames, wherein the first number of times and the second number of times are determined by the user setting speed.

BRIEF DESCRIPTION OF THE DRAWINGS

The preferred embodiment is described with reference to the drawings wherein:

FIG. 4 is a graph showing construction of second moving picture frames for low-speed reproduction from first moving picture frames for normal-speed reproduction using the apparatus shown in FIG. 3.

DETAILED DESCRIPTION OF THE PREFERRED EMBODIMENTS

Figure 1:
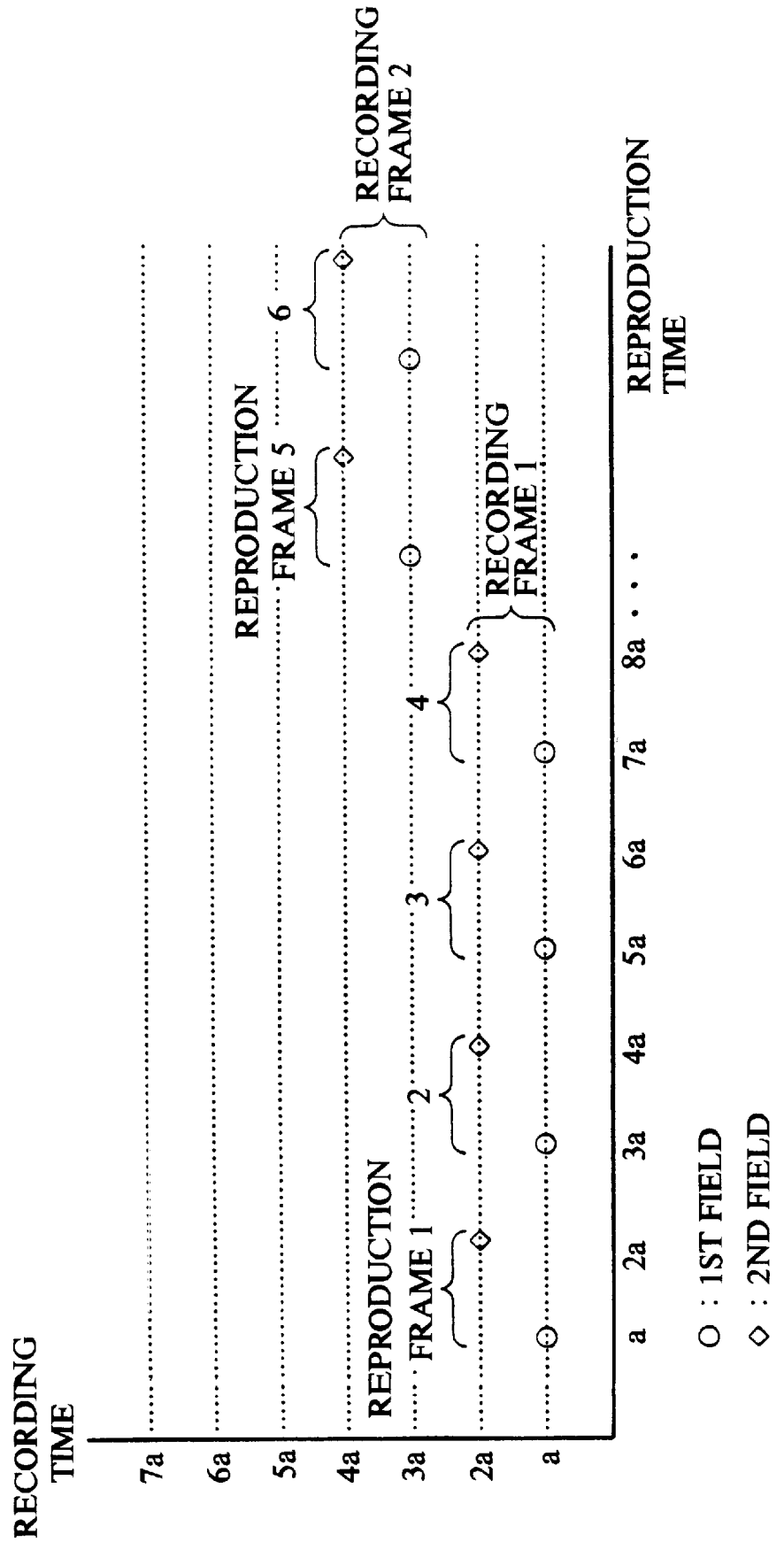
FIG. 1 is a graph showing frame construction for low-speed reproduction using a conventional frame repetition method.
Figure 2:
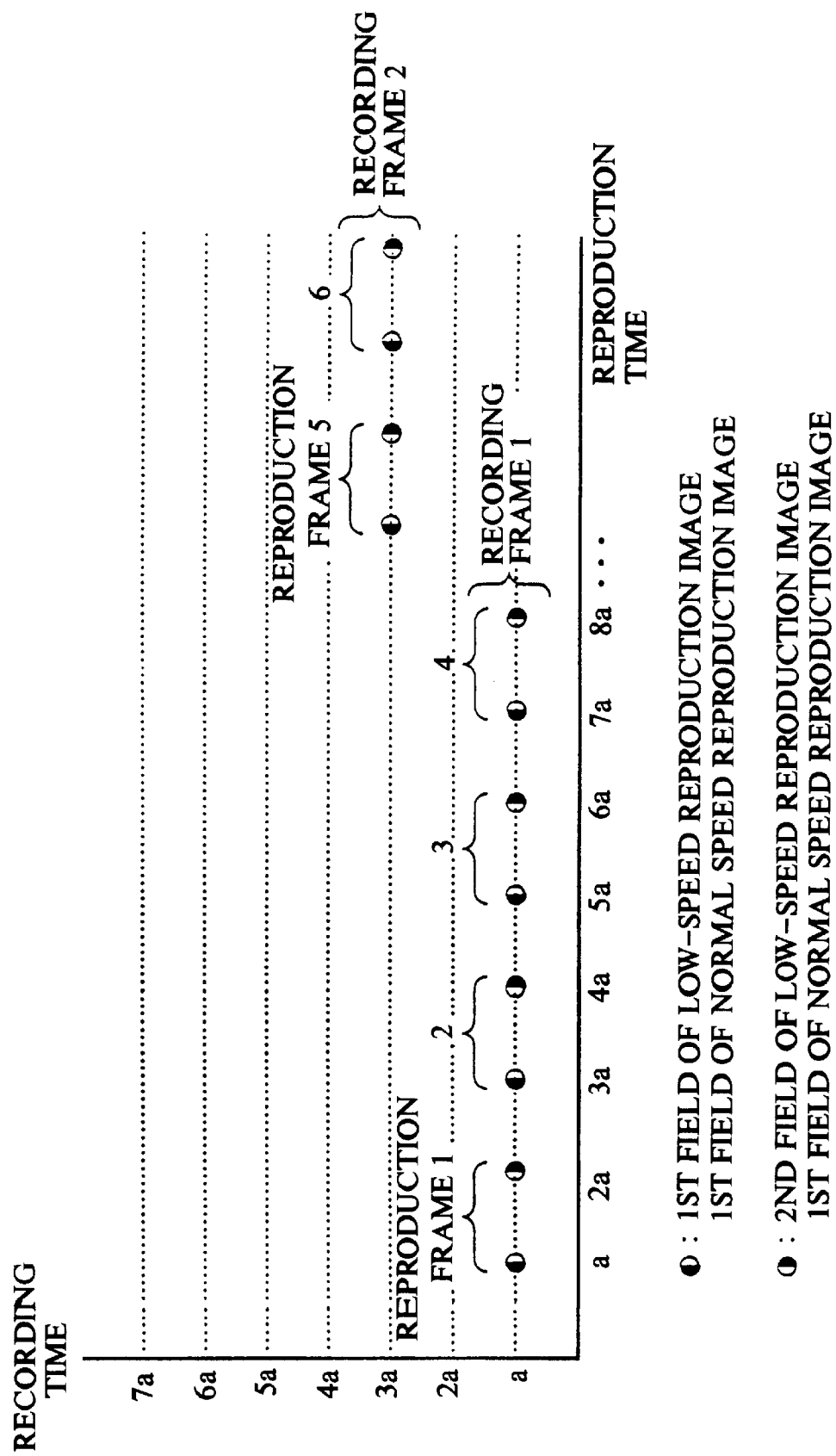
FIG. 2 is a graph showing frame construction for low-speed reproduction using a conventional field repetition method.

Reference will now made in detail to the present preferred embodiments of the present invention, examples of which are illustrated in the accompanying drawings, wherein like reference numerals refer to the like elements throughout.

Figure 3:
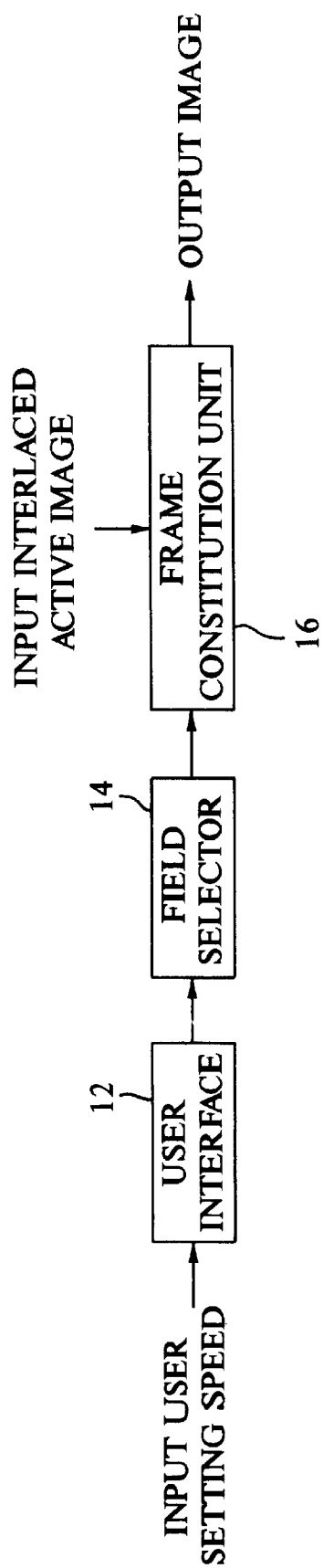
FIG. 3 is a block diagram of an apparatus for constructing second moving picture reproduction frames for low-speed reproduction from first moving picture frames for normal-speed reproduction according to a preferred embodiment of the present invention.

FIG. 3 shows an apparatus, according to a preferred embodiment of the present invention, for constructing second moving picture frames for low-speed reproduction from first moving picture frames for normal-speed reproduction. The apparatus shown in FIG. 3 generally comprises a user interface 12, a field selector 14 and a frame construction unit 16. The user interface 12 receives a user setting speed (or more simply: reproduction speed) for low-speed reproduction. The field selector 14 responds to the user setting speed to use field data contained in first moving picture frame data to generate a field select mode signal for constructing the second moving picture frames. The frame construction unit 16 constructs the second moving picture frames for low-speed reproduction in response to the field select mode signal.

FIG. 4 is a graph showing construction of second moving picture frames for low-speed reproduction from first moving picture frames for normal-speed reproduction using the apparatus shown in FIG. 3. FIG. 4 shows, as an example, construction of frames for low-speed reproduction at a quarter of normal-speed.

The user interface 12 receives the user setting speed of a quarter speed reproduction. The field selector 14 outputs a field select mode signal instructing that among the second moving picture frames for a quarter speed reproduction, two low-speed reproduction frames are created using the moving picture data of the first field in the first moving picture frame, and the following two low-speed reproduction frames are created using the moving picture data of the second field in the first moving picture frame.

The frame construction unit 16 responds to the field select mode signal output from the field selector 14 to repeatedly select the moving picture data of the first field and that of the second field contained in each of the input first moving picture frame data, by a first number of times and a second number of times, to construct the second moving picture frames corresponding to the first moving picture frame. In the above example, using low-speed reproduction at a quarter of the normal-speed, the moving picture data of the first field and that of the second field are each selected twice, (i.e., the first and second number is "2") to construct frames for the low-speed reproduction. In the case of low-speed reproduction at a third of normal-speed reproduction, either the moving picture data of the first field is selected once and that of the second field is selected twice, (i.e., the first number is "1" and the second number is "2") or the moving picture data of the first field is selected twice or that of the second field is selected once (i.e., the first number is "1" and the second number is "2").

Figure 5A:
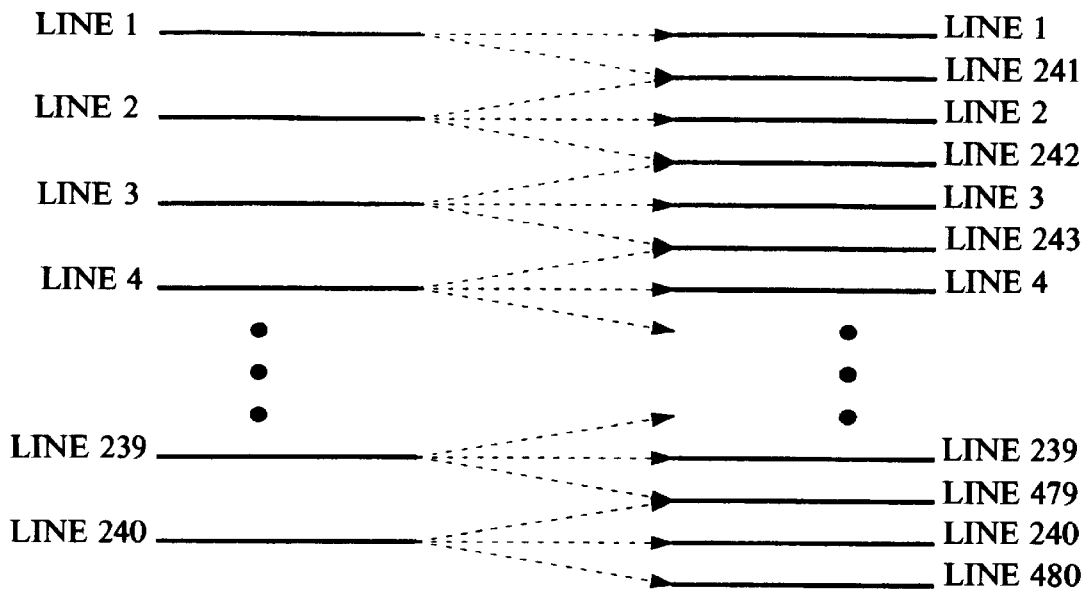
FIGS. 5A and 5B are drawings showing construction of the second moving picture frames of FIG. 4 using a filter from lines constituting fields of the first moving picture.
Figure 5B:
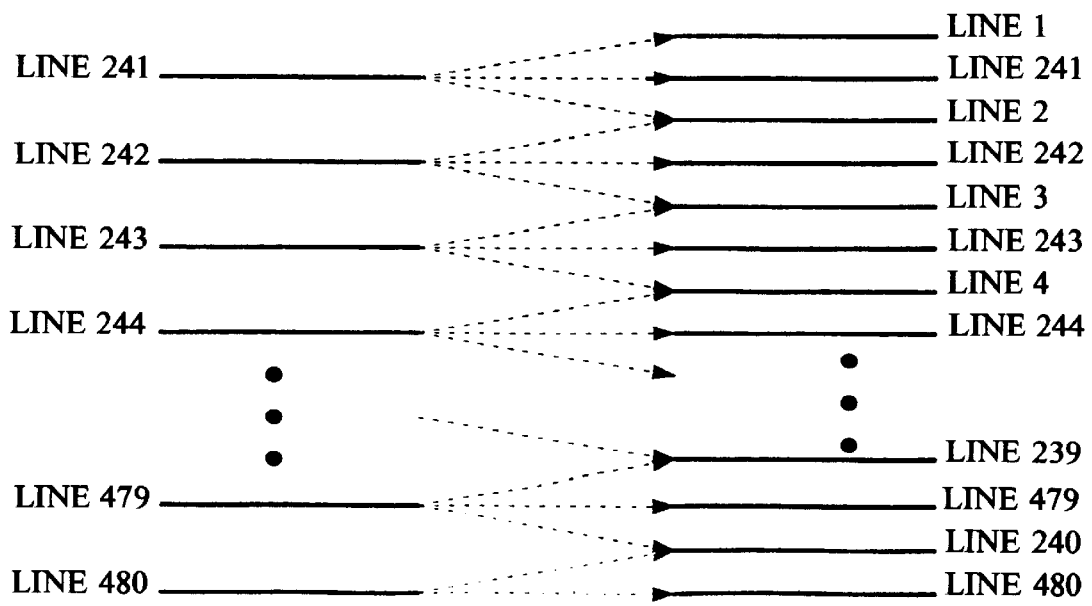

To reduce fluctuation, it is preferable that, when creating the second field that it not be an exact copy of the first field but produced based upon the original field using, for example, averaging. FIGS. 5A and 5B are drawings showing reconstruction of the second moving picture frames shown in FIG. 4 using a filter from lines constituting fields of the first moving picture.

FIG. 5A shows construction of a frame corresponding to the first field contained in the first moving picture frame for normal-speed reproduction. In this example, the first field of a frame for normal-speed reproduction is composed of lines 1 to 240 and the second field thereof is composed of lines 241 to 480. The first two frames of the second moving picture frame in the low-speed reproduction are constructed using lines 1 to 240 (consisting of the first field of the first moving picture frame in the normal-speed reproduction). The following two frames are constructed using lines 241 to 480 (consisting of the second field of the first moving picture frame in the normal-speed reproduction). As shown in FIG. 5, for example, line 1 of the first field becomes line 1 of the second moving picture frame, while line 241 of the second moving picture frame is obtained by averaging line 1 and line 2. Generally, construction of each frames by the first field and the second field requires different filters because the two fields are disposed at a different position on the frame.

As described above, the apparatus of the present invention reconstructs frames for low-speed reproduction of a moving picture recorded in an interlaced scanning mode. The apparatus reconstructs frames for low-speed reproduction uses the two fields contained in frame data for normal-speed reproduction, thereby reproducing a natural image without vibration of a picture or mixing-up of time order. One of ordinary skill in the art will recognize that the invention can be implemented on a general purpose computer with appropriate hardware and software or on a specific purpose apparatus.

While only a certain embodiment of the invention has been specifically described herein, it will be apparent that numerous modifications may be made thereto without departing from the spirit and scope of the invention.

What is claimed is:

1. An apparatus for constructing second moving picture frames for slow-speed reproduction from first moving picture frames for normal-speed reproduction, the apparatus comprising:

a user interface receiving a user setting speed;

a field selector generating a field select mode signal for constructing the second moving picture frames from the first moving picture frames in response to the input user setting speed; and a frame constructor that, in response to the field select mode signal, repeatedly selects a first field and a second field from each of the first moving picture frames, to construct the second moving picture frames corresponding to the first moving picture frames, such that the first and second fields of the second moving picture frames are generated by forming the first field of the second moving picture frames directly from the selected first or second fields of the first moving picture frames, and forming the second field of the second moving picture frames by way of averaging the selected field, wherein the number of times the first and second fields are selected is determined by the user setting speed.

2. The apparatus according to claim 1, wherein the number of times the first and second fields are selected is N respectively, when the user setting speed is 1/N times the speed for normal-speed reproduction and N is a multiple of 2, the selected each N fields for the first and second fields include the same number of fields generated by way of averaging the first and second fields respectively.

3. The apparatus according to claim 2, wherein said frame constructor uses a first moving picture frame to construct N second moving picture frames using N first fields and N the second fields of the first moving picture frame.

4. A slow-speed motion picture producing apparatus comprising:

a frame constructor that receives an interlaced signal of original normal-speed frames of a normal-speed motion picture, each of the original frames having first and second fields, and outputs a slow speed motion picture by forming a plurality of new frames, each new frame being based on one of the first and second fields, at least one of the new frames being based on the first field and at least one subsequent new frame being based on the second field, such that a field of at least one of the new frames is generated by way of averaging a field of one of the original frames, wherein said frame constructor forms each new frame from one of the first and second fields, of one of the original frames, by forming a first field for the new frame directly from a selected one of first and second fields from the original frame and a second field for the new frame by said averaging the data in the selected field.

5. A slow-speed motion picture producing apparatus, as set forth in claim 4, further comprising:
   a field selector that indicates to said frame constructor how many new frames to output for each normal-speed frames.

6. A slow-speed motion picture producing apparatus, as set forth in claim 4, further comprising:
   a user interface that allows a user to select an output speed of the slow-speed motion picture.

7. A slow-speed motion picture producing apparatus, as set forth in claim 6, wherein the user selects an output speed that is a fraction of the speed of the normal-speed of the motion picture.

8. A slow-speed motion picture producing apparatus, as set forth in claim 6 wherein if the user selects a speed 1/N where N is a multiple of 2, said frame constructor forms N new frames from each of the first and second fields.

9. A program stored on a computer readable medium comprising the procedures of:
   receiving input frames of a first interlaced motion picture, each frame having first and second input fields; and
   for each input field of each input frame, forming at least one output frame to produce a second interlaced motion picture for slow-speed reproduction, such that first and second output fields of at least one of the output frames of the second interlaced motion picture is generated by forming a first output field directly from a selected one of the first and second input fields of the first interlaced motion picture, and forming a second output field by way of averaging the selected field.

10. A program, as set forth in claim 9, further comprising the procedures of:
    receiving a factor N of how much the second interlaced motion picture is to be slower than the first interlaced motion picture;
    wherein the procedure of forming outputs N fields for each input field of each input frame when N is a multiple of 2, outputs N fields including (N−1)/2 fields generated by way of the averaging one of the first and second input fields and N fields including ((N−1)/2)+1 fields generated by way of the averaging the other of first and second input fields when N is not a multiple of 2.

11. A program, as set forth in claim 9, wherein the procedure of forming forms each of the output frames by copying a selected one of the first and second input fields as a first output field of the output frame and performs said averaging of the selected input field to form a second input field of the output frame.

12. A program, as set forth in claim 11, wherein each input field comprises a plurality of lines and said averaging is performed by averaging adjacent lines in the field.

13. A method comprising the steps:
    receiving input frames of a first interlaced motion picture, each frame having first and second input fields;
    for each input field of each input frame forming at least one output frame to produce a second interlaced motion picture for slow-speed reproduction, such that first and second output fields of at least one of the output frames of the second interlaced motion picture is generated by forming a first output field directly from a selected one of the first and second input fields of the first interlaced motion picture, and forming a second output field by way of averaging the selected field.

14. A method, as set forth in claim 13, further comprising the steps:
    receiving a factor N of how much the second interlaced motion picture is to be slower than the first interlaced motion picture;
    and wherein the procedure of forming outputs N fields for each input field of each input frame when N is a multiple of 2, outputs N fields including (N−1)/2 fields generated by way of the averaging one of the first and second input fields and N fields including ((N−1)/2)+1 fields generated by way of the averaging the other of first and second input fields when N is not a multiple of 2.

15. A method, as set forth in claim 13, wherein the step of forming forms each of the output frames by copying a selected one of the first and second input fields as a first output field of the output frames and performs said averaging of the selected input field to form a second output field of the same frame.

16. A method as set forth in claim 15, wherein each input field comprises a plurality of lines and said averaging is performed by averaging adjacent lines in the field.

* * * * *